United States Patent
Erickson et al.

(10) Patent No.: US 7,073,989 B2
(45) Date of Patent: Jul. 11, 2006

(54) RE-CONFIGURABLE BUSHING AND DRILL INCORPORATING SAME

(75) Inventors: Chris J. Erickson, Garden Grove, CA (US); Chin H. Toh, Orange, CA (US)

(73) Assignee: The Boeing Company, Chicago, IL (US)

( * ) Notice: Subject to any disclaimer, the term of this patent is extended or adjusted under 35 U.S.C. 154(b) by 329 days.

(21) Appl. No.: 10/403,884

(22) Filed: Mar. 31, 2003

(65) Prior Publication Data

US 2004/0191017 A1    Sep. 30, 2004

(51) Int. Cl.
*B23B 45/00*    (2006.01)

(52) U.S. Cl. .................. 408/97; 408/112; 408/712

(58) Field of Classification Search ............ 408/95, 408/97, 103, 110, 112, 130, 712
See application file for complete search history.

(56) References Cited

U.S. PATENT DOCUMENTS

| | | | | |
|---|---|---|---|---|
| 2,811,877 | A * | 11/1957 | Brooks ..................... 408/130 |
| 2,854,870 | A * | 10/1958 | Chaffee et al. ................ 173/8 |
| 2,860,531 | A * | 11/1958 | De Groff ................... 408/130 |
| 2,869,403 | A * | 1/1959 | Bent ......................... 408/130 |
| 2,935,905 | A * | 5/1960 | Winslow ................... 408/112 |
| 4,997,319 | A * | 3/1991 | Arai et al. .................... 408/17 |
| 5,024,562 | A * | 6/1991 | Arai et al. .................. 408/1 R |
| 5,161,923 | A * | 11/1992 | Reccius .................... 408/72 R |
| 5,199,830 | A * | 4/1993 | Otani et al. .................... 408/67 |
| 5,404,641 | A   | 4/1995 | Bratten et al. |
| 5,482,411 | A * | 1/1996 | McGlasson ................. 408/1 R |
| 5,542,796 | A   | 8/1996 | Bratten et al. |
| 5,848,859 | A * | 12/1998 | Clark et al. ................. 408/1 R |
| 5,876,156 | A * | 3/1999 | Yamaura et al. .............. 408/95 |
| 5,927,919 | A   | 7/1999 | Blankenship et al. |
| 5,961,258 | A   | 10/1999 | Ende et al. |

FOREIGN PATENT DOCUMENTS

EP                346231 A1 * 12/1989

* cited by examiner

*Primary Examiner*—Boyer D. Ashley
*Assistant Examiner*—J Williams
(74) *Attorney, Agent, or Firm*—Alston & Bird LLP

(57) ABSTRACT

A bushing and associated drill are provided that may be actuated either pneumatically or with a spring in order to be biased into contact with a structure, such as a multi-layer structure, to reduce gaps therewithin. The bushing includes a housing and a nose piece slidably disposed relative to the housing. The bushing also includes a gas inlet in communication with the internal cavity such that the nose piece may be pneumatically urged forwardly relative to the housing and into operable contact with the structure. The bushing may also include a mounting mechanism for releasably attaching the housing to a drill motor. The mounting mechanism permits the housing to be detached from the drill motor to access the internal cavity, thereby permitting a spring to be inserted that will bias the nose piece forwardly relative to the housing. Spring actuation may be an alternative or a supplement to pneumatic actuation.

32 Claims, 5 Drawing Sheets

RE-CONFIGURABLE BUSHING AND DRILL INCORPORATING SAME

FIELD OF THE INVENTION

The present invention relates generally to bushings for drills and the like and, more particularly, to re-configurable bushings that may be actuated either pneumatically or with a spring so as to permit the bushing to be utilized in conjunction with a wide variety of drills and the like.

BACKGROUND OF THE INVENTION

Holes must be drilled in various structures for many different purposes. For example, holes must frequently be drilled through structures so as to permit fasteners to subsequently be inserted through the holes in order to attach or join the structures. In one example, the assembly of an aircraft required thousands of holes to be drilled so as to permit fasteners to be installed in order to join the various components of the aircraft. In this regard, many holes must be drilled through the skin in order to install fasteners to connect the skin to doublers, stringers and other components of the frame of the aircraft. Similarly, holes must be drilled during the assembly process of other vehicles, as well as a wide variety of other structures including buildings, bridges and the like.

In a number of these applications, holes must be drilled through a plurality of different layers that have been stacked one upon another. During the assembly of an aircraft, for example, holes may be formed through the skin of the aircraft, a doubler, a stringer and/or a beauty strip as well as other components of the frame. In order for the holes through these multiple components to be aligned, it is advantageous, if not essential, that a single hole be drilled through the multiple components once the components have been stacked one upon another. Unfortunately, gaps often exist between the different layers of a multi-layer structure or are created during the process of drilling a hole through a multi-layer structure. While these gaps could otherwise generally be closed following the installation of a fastener through the hole, these gaps facilitate the formation of inter-laminar burrs about the periphery of the hole being formed. In addition, chips generated during the drilling operation may enter the gap and migrate through the gap away from the hole that has been formed. If not removed, these inter-laminar burrs and chips that have migrated within the gap would prove quite disadvantageous. For example, the inter-laminar burrs and chips trapped within the gaps may prevent fasteners that are subsequently installed in the holes from completely closing the gaps such that the resulting laminar structure continues to have gaps therein.

In those instances in which the multi-layer structure has not yet been fastened together, such as by fasteners inserted through holes defined by the multi-layer structure, the various components may be disassembled and cleaned in order to remove the burrs and chips. The cleaned components are then reassembled and aligned. In order to permit proper installation of fasteners through the multi-layer structure, the various components must be precisely aligned such that the holes that have been formed through the various components extend through the entire structure. As will be apparent, this process of disassembling, cleaning and reassembling a multi-layer structure following hole formation but prior to fastener installation is time consuming and increases the costs of the resulting structure. Moreover, in some instances, holes are drilled in a multi-layer structure that has already been fastened together, such as by fasteners joining other portions of the structure. In these instances, it is generally infeasible to disassemble the multi-layer structure and, as such, the resulting structure may disadvantageously include inter-laminar burrs and chips that have been introduced into the gaps during the process of drilling or otherwise forming holes therethrough.

It would also be desirable to provide a drill for forming holes in various structures, including multi-layer structures, that reduces, if not eliminates, the formation of inter-laminar burrs and the introduction and migration of chips through gaps within the structure. It would therefore be desirable to provide a drill capable of drilling holes through a multi-layer structure in such a way that gaps that may exist within the structure are reduced, if not eliminated, and that reduces, if not eliminates, the likelihood that additional gaps will be formed during the drilling process.

BRIEF SUMMARY OF THE INVENTION

An improved bushing as well as a drill incorporating the bushing are provided according to the present invention. The bushing is adapted to be biased into contact with the surface of a structure, such as a multi-layer or laminate structure, and to permit force to be applied to the structure which will reduce, if not eliminate, any gaps existing within the structure and which will reduce, if not eliminate, the likelihood of additional gaps forming during the process of drilling a hole through the structure. Thus, the bushing and associated drill of the present invention advantageously reduce the formation of inter-laminar burrs and the introduction and migration of chips within gaps within a structure, including a multi-layer structure. As such, a drill incorporating the bushing of the present invention may form holes in a structure, such as a multi-layer structure, without having to subsequently disassemble and clean the components of the structure in order to remove the inter-laminar burrs and chips prior to installation of the fasteners, thereby increasing the speed with which fasteners may be installed in various structures and, in particular, multi-layer or laminate structures, and correspondingly reducing the assembly costs associated therewith.

According to one advantageous embodiment, a pneumatically actuated bushing is provided that includes a housing extending lengthwise between opposed forward and rear ends and defining an internal cavity. The housing also defines openings into the internal cavity through the opposed forward and rear ends. The bushing also includes a nose piece slidably disposed relative to the housing. A forward portion of the nose piece is capable of extending through the opening defined by the forward end of the housing. As such, the forward end of the nose piece may be disposed in operable contact with the structure in which a hole is to be formed. The nose piece may also include a rear portion that is larger than the opening defined by the forward end of the housing. Thus, the nose piece is at least partially retained within the housing since the nose piece cannot be completely removed from the housing via the opening defined by the forward end of the housing.

The bushing also includes a gas inlet in communication with a rear portion of the internal cavity. The rear portion of the internal cavity is defined by the housing between the rear portion of the nose piece and the rear end of the housing. By introducing gas, such as air, into the rear portion of the internal cavity via the gas inlet, the nose piece may be pneumatically urged or biased forwardly relative to the housing and into contact with the structure through which a hole is to be formed. The bushing may also include a gas outlet in fluid communication with the rear portion of the internal cavity defined by the housing.

By being urged into contact with a structure in which a hole is be formed, the bushing applies a force to the structure in which the hole is to be formed. In instances in which the structure in which the hole is to be formed has multiple layers, the force may cause the multiple layers to be pressed together, thereby advantageously reducing, if not eliminating, any gaps that may exist between the layers. During the subsequent drilling operation, the force applied by the pneumatically actuated bushing of present invention may be maintained so that the inter-laminar burrs otherwise created during the drilling process are reduced, if not eliminated, and the chips that are introduced into gaps between the layers of the structure are correspondingly reduced, if not eliminated. As such, the multi-layer or laminar structure advantageously need not be disassembled, cleaned and reassembled following the drilling process and prior to installation of a fastener or the like through the holes formed in the structure, as required by at least some conventional drilling processes.

According to one advantageous embodiment, the bushing is not only capable of being pneumatically actuated, but may also be reconfigured utilizing the same components, i.e., the housing, the nose piece and the gas inlet, so as to permit spring actuation, if desired. In this embodiment, the re-configurable bushing also includes a mounting mechanism for releasably attaching the housing to a drill motor. The mounting mechanism permits the housing to be detached from the drill motor so as to access the rear portion of the internal cavity. According to this embodiment, the rear portion of the internal cavity is sized to receive a spring, such as a cylindrical or a conical spring, that will bias the nose piece forwardly relative to the housing. The re-configurable bushing of this embodiment therefore permits the nose piece to be alternately actuated pneumatically by gas introduced into the rear portion of the internal cavity via the gas inlet and mechanically by a spring disposed in the rear portion of the internal cavity, or by combination of pneumatic and spring actuation.

The bushing may also include a support structure extending lengthwise in a rearward direction from the housing. This support structure also defines an internal cavity that is adapted to receive a chuck that typically carries the tool, such as a drill bit, and is rotatably driven by the drill motor. The support structure generally defines an opening to the internal cavity for facilitating access to the chuck. The bushing of this embodiment may also include a mounting bracket for attaching the support structure to a drill motor. Additionally, the support structure may include an end plate proximate the rear end of the housing. The end plate defines an opening though which the tool carried by the chuck extends. The end plate also incorporates the gas inlet and, at least in some embodiments, the gas outlet. In the embodiments that include a support structure, the mounting mechanism generally releasably attaches the housing to the support structure such that the housing and the support structure may be detached to provide access to the internal cavity such as for inserting or removing a spring during reconfiguration of the bushing.

The bushing may also include a guide member extending lengthwise through the housing. The guide member has a forward end exposed within a passage defined by the nose piece. In this regard, the guide member and the passage defined by the nose piece may be sized such that the guide member is snugly disposed within the passage defined by the nose piece. The guide member is advantageously fixed in position relative to the housing, such as by being attached to the support structure. To facilitate the slidable movement of the nose piece relative to the housing and to facilitate the pneumatic actuation of the nose piece by limiting the air that escapes from the rear portion of the internal cavity, other than the air that is extracted via a gas outlet, the bushing may also include a first seal between the nose piece and the housing and a second seal between the guide member and the nose piece. The rear portion of the nose piece is generally annular and, in those embodiments that include a guide member, the annular rear portion of the nose piece advantageously extends from the guide member to the housing to divide the internal cavity into forward and rear portions, thereby further facilitating the pneumatic actuation of the nose piece.

In addition to the bushing, a drill including the bushing of the present invention is also provided according to another aspect of the present invention. The drill further includes a drill motor, and a chuck for engaging a tool, such as a drill bit, that is operatively connected to the drill motor. The drill motor may be pneumatically actuated, and, as such, a common gas supply may be utilized to supply gas, such as shop-air, to both the drill motor and the gas inlet of the bushing to facilitate pneumatic actuation of the bushing. In order to regulate the pressure within the rear portion of the internal cavity, the drill may include a regulator in fluid communication with the gas outlet or inlet. Accordingly, the nose piece may be urged forwardly relative to the housing and into contact with the structure in which a hole is to be formed in order to reduce gaps within a multi-layer structure and, consequently, to reduce, if not eliminate, inter-laminar burrs and chip migration through gaps within the structure. As a result of the reconfigurability of the bushing, the bushing may advantageously be activated either pneumatically or, in instances in which a spring is disposed within the rear portion of the internal cavity defined by the housing, by spring actuation.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
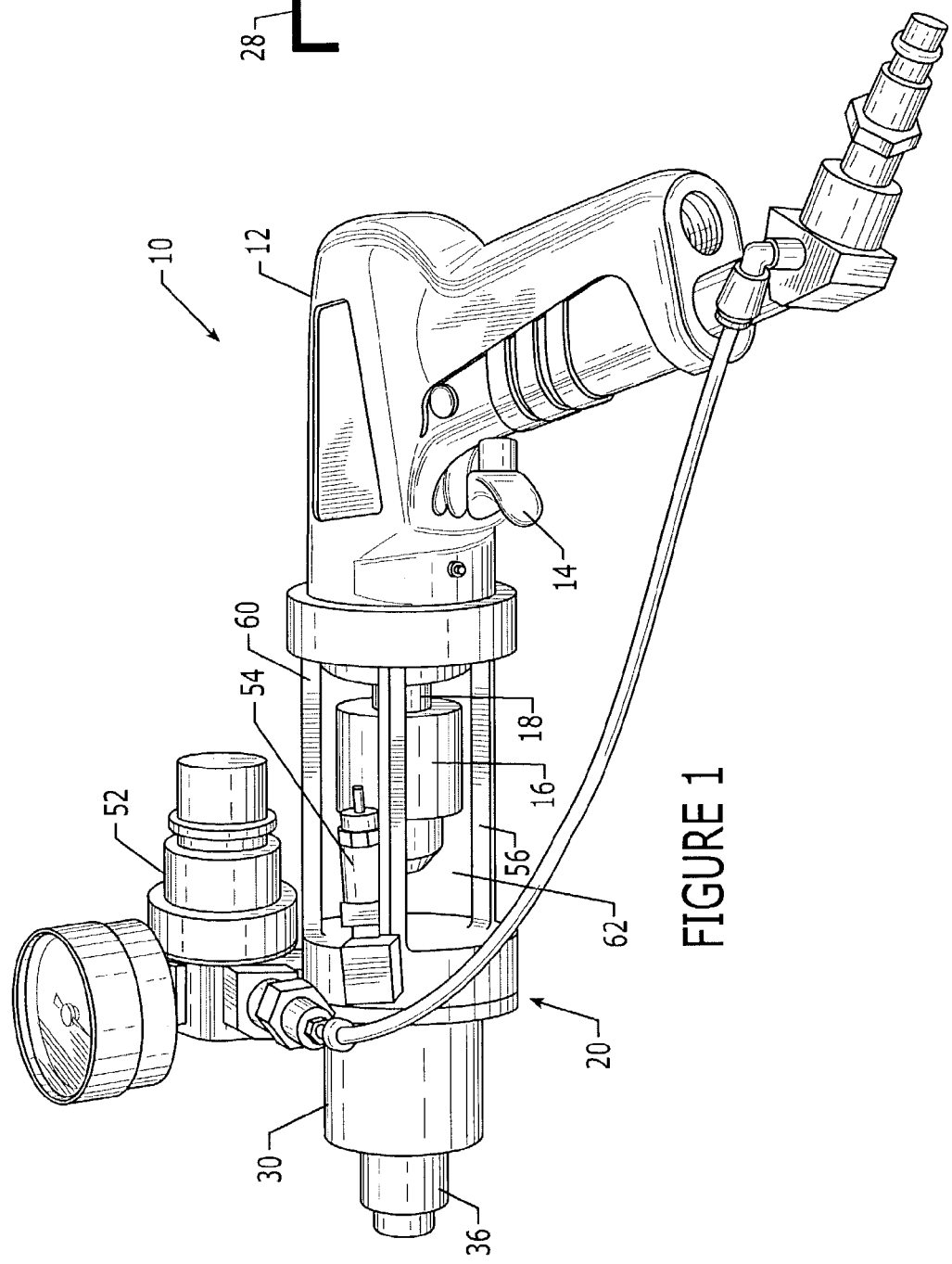
FIG. 1 is a perspective view of a drill according to one embodiment of the present invention.

Referring now to FIG. 1, a drill 10 according to one embodiment of the present invention is depicted. The drill includes a drill motor 12. Although the drill motor is a pneumatically actuated drill motor in one embodiment of the present invention as described below, the drill motor of other embodiments may be actuated in other manners including electrically or the like. Regardless of the manner in which the drill motor is actuated, the drill motor is generally a conventional drill motor, such as a pistol-grip type commercially available from Rockwell Industries. As shown in FIG. 1 and as known to those skilled in the art, the drill motor generally includes a housing that includes a hand grip that is grasped by a technician during drilling operations and that includes a trigger 14 for initiating and continuing drilling operations.

The drill 10 also includes a chuck 16. As further known to those skilled in the art, the drill motor generally rotatably drives a shaft 18. The chuck, in turn, is mounted upon the distal end of the shaft for rotation therewith. The chuck is adapted to engage a tool, such as a drill bit such that actuation of the drill motor 12 will cause both the chuck and the drill bit to rotate. The chuck also permits the tool to be released following drilling operations such that another tool, such as a drill bit of a different size or type, may be inserted. As such, a technician must generally have access to the chuck.

As described in detail below, the drill 10 of the present invention also includes a bushing 20 that may be actuated and forced into contact with the surface of a structure in which a hole is to be drilled. The drill and, in particular, the bushing therefore impart a force to the structure. While the drill of the present invention may be utilized to drill holes in different types of structures that have a wide variety of end uses or applications, the drill is advantageously capable of drilling holes through multi-layer or laminate structures. In this regard, the force applied to the multi-layer structure serves to force the layers together, thereby reducing, if not eliminating, gaps between the layers of the structure that could either exist prior to the drilling operations or may otherwise be created during the drilling operations in the absence of the application of force by the bushing of the present invention.

By reducing, if not eliminating, gaps in the multi-layer structure, the drilling operations produce fewer, if any, inter-laminar burrs relative to conventional drilling processes. The drilling operations also allow fewer, if any, chips to migrate or collect within gaps in the multi-layer structure relative to conventional drilling processes. Accordingly, the drill 10 of the present invention will drill holes in multi-layer structures in such a manner that the multi-layer structures will not have to be cleaned as extensively as conventional multi-layer structures in order to remove inter-laminar burrs and chips within gaps in the structure. Advantageously, the drill of the present invention will permit holes to be drilled in multi-layer structures without creating any meaningful quantity of inter-laminar burrs or chips within gaps within the multi-layer structure such that the multi-layer structure need not be disassembled, cleaned, reassembled and aligned as in conventional drilling processes. Instead, a multi-layer structure in which holes have been formed with the drill of the present invention may be immediately subjected to further assembly operations, such as by installing fasteners through the holes drilled in the structure. Accordingly, the drill and associated bushing 20 of the present invention advantageously reduce the time required for assembly of a multi-layer structure and correspondingly reduce the assembly costs.

Figure 2:
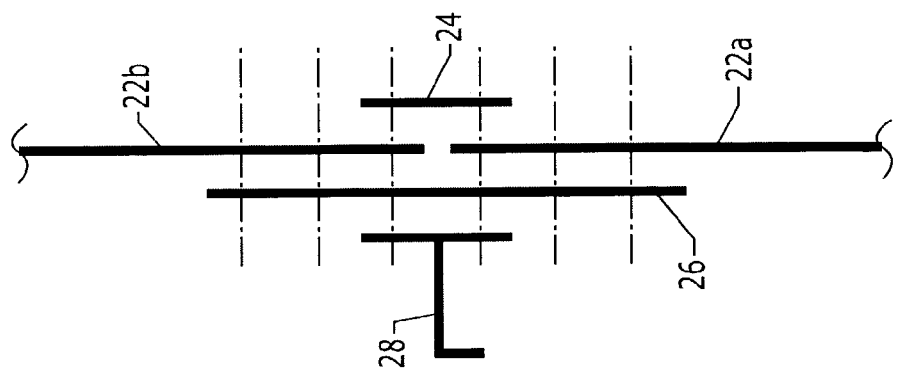
FIG. 2 is a schematic cross-sectional view of a portion of an aircraft illustrating the attachment of first and second skin portions to an underlying frame assembly including a stringer.

As a result of the advantages provided by the drill 10 and bushing 20 of the present invention, the drill and associated bushing may be utilized to drill holes in structures utilized for a wide variety of applications. In one embodiment, for example, the drill may be utilized to drill holes in predefined locations of various aircraft components. In this regard, the skin of an aircraft generally attaches to a frame assembly by means of a large number of fasteners, thereby requiring a significant number of holes to be formed through the skin and into aligned portions of the frame assembly. In one example depicted somewhat schematically in FIG. 2, a portion of the skin of an aircraft is comprised of a first skin section 22a and a second skin section 22b that are disposed proximate one another. On the exterior surface, a beauty strip 24 is positioned over the seam or gap between the first and second skin portions, while on the interior surface, a doubler 26 extends across the seam or gap between the first and second skin portions. As also shown in FIG. 2, a stringer 28 or other component of the frame assembly of the aircraft may be attached to the skin and, in particular, to the doubler.

In order to join these components, a plurality of holes are drilled as indicated by the dashed lines. Fasteners may then be inserted through the holes to secure the components together. In this regard, a plurality of holes are formed through the skin 22 and the doubler 26 to permit fasteners to directly attach the doubler to the skin. Likewise, a plurality of holes are formed through the beauty strip 24, the first and second portions of the skin, the doubler and the stringer 28 such that fasteners may similarly be installed to attach these components together. As shown, holes must thereby be formed through multiple components. By utilizing the drill 10 and the associated bushing 20 of the present invention, force may be applied to the structure in order to reduce, if not eliminate, gaps between the components, such as between the skin and the doubler, between the beauty strip and the skin and between the doubler and the stringer.

This process of forming a plurality of holes and subsequently installing fasteners in order to attach the skin 22 of an aircraft to the underlying frame assembly must be repeated many times, typically many thousands of times, during the assembly of an aircraft. As such, any time or cost savings that may be introduced during the process of forming holes through the multi-layer structure and subsequently installing fasteners will have a significant impact on the overall assembly time and costs since these savings will be enjoyed many times over. While the drill 10 and associated bushing 20 may be utilized to drill holes in various components utilized during the assembly of an aircraft, the drill and associated bushing may be utilized to drill holes in a wide variety of other structures, including the components assembled to form other vehicles, structures utilized in constructing buildings, bridges and the like, and in other applications as will be readily apparent to those skilled in the art.

Figure 3:
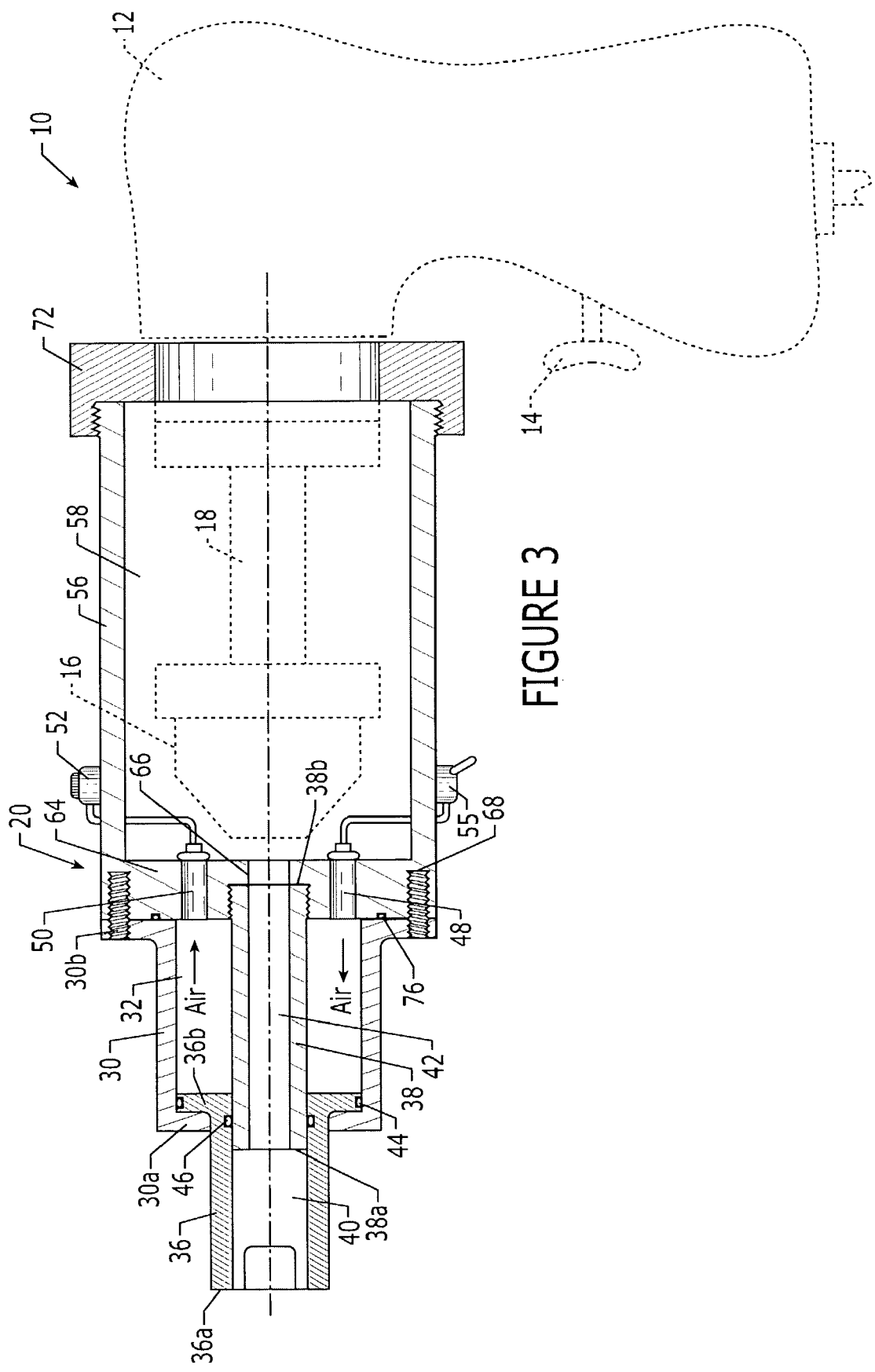
FIG. 3 is a cross-sectional side view of a bushing configured for pneumatic actuation according to one embodiment of the present invention in which other components of the drill are depicted in dashed lines for reference purposes.

As shown in more detail in FIG. 3, the bushing 20 of the present invention is capable of being pneumatically actuated so as to be urged into contact with the structure in which a hole is to be drilled. The bushing is generally mounted to the drill motor 12 as described below and, as such, may at least partially surround the chuck 16. However, the technician may still readily access the chuck so as to switch drill bits for the like. For illustrative purposes, the drill motor and chuck are shown in dashed lines in FIGS. 3 and 4, while the bushing is shown in solid lines.

The bushing 20 includes a housing 30 that is fixed in position relative to the drill motor 12. The housing extends lengthwise between opposed forward and rear ends 30a and 30b. The housing also defines an internal cavity 32 and openings into the internal cavity through each of the opposed ends. In the embodiment depicted in FIGS. 3 and 4, the housing has a generally cylindrical body with an annular flange extending radially outward at the rear end thereof and another annular flange extending radially inward at the forward end thereof. However, the housing need not be cylindrical and may have other shapes if desired. Regardless of the shape of the housing, the opening defined by the rear end of the housing is advantageously larger than the opening defined by the forward end of the housing.

Figure 4:
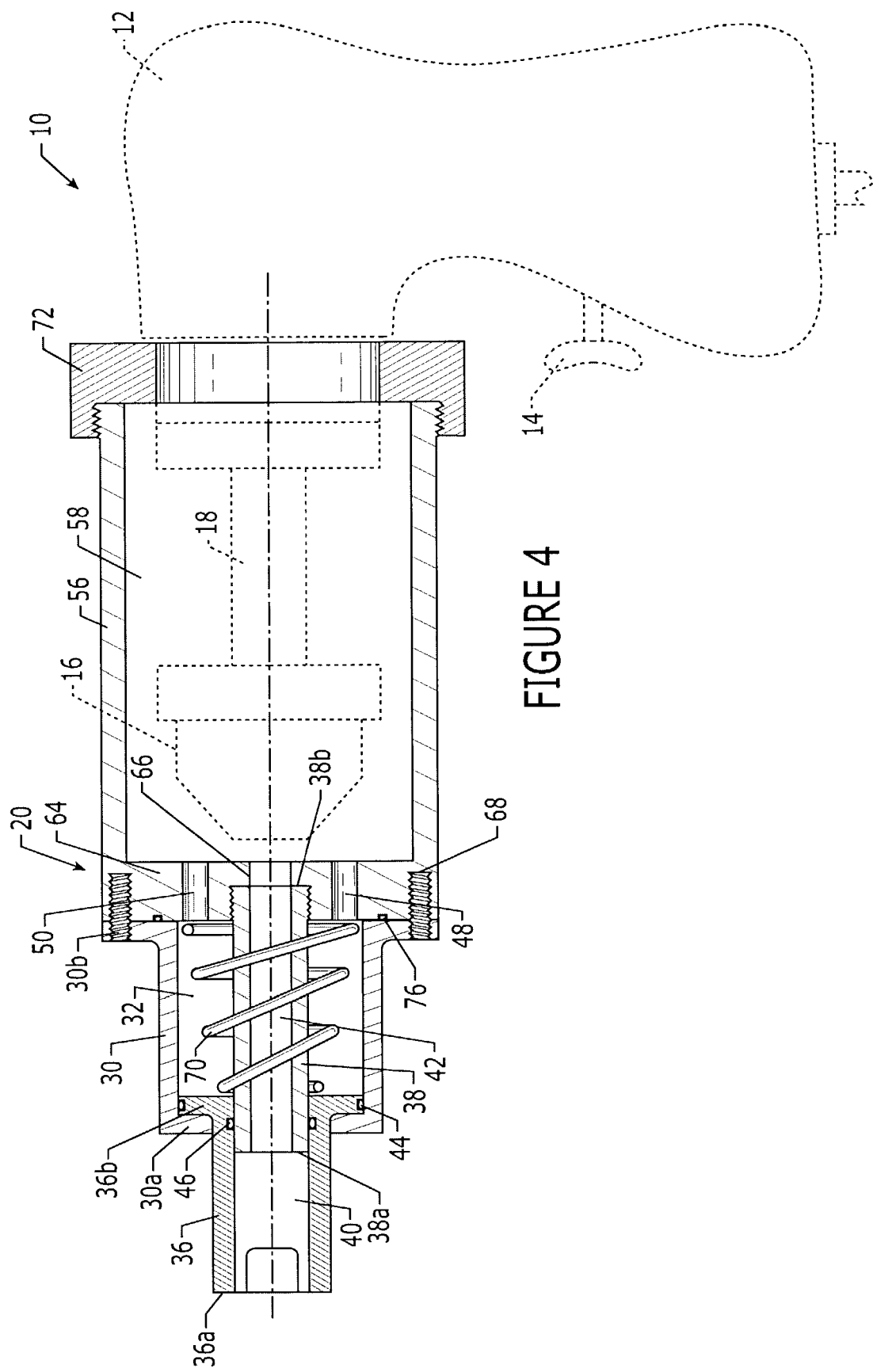
FIG. 4 is a cross-sectional side view of the bushing of FIG. 3 following reconfiguration so as to include a spring in which the other components to the drill are again depicted in dashed lines for reference purposes.

The bushing 20 also includes a nose piece 36 that is slidably disposed relative to the housing 30. As such, the nose piece may move forwardly and rearwardly relative to the housing. In the embodiments of FIGS. 3 and 4, the nose piece is shown to be in its most forward position relative to the housing. However, the nose piece need not always extend forwardly to such an extent since the nose piece is capable of sliding rearwardly within the housing depending upon the force applied thereto. As shown, the nose piece also generally has a cylindrical body with a rear portion comprised of a radially outwardly extending flange at the rear end 36b thereof. As with the housing, the nose piece need not be cylindrical, but may have other shapes. Regardless of the shape of the nose piece, however, the forward end 36a of the nose piece, and generally the body of the nose piece, is shaped and sized so as to extend through the opening defined by the forward end 30a of the housing. Thus, the forward end of the nose piece may project forwardly beyond the forward end of the housing. However, the rear end of the nose piece has a shape and size that prevents the rear end of the nose piece from passing through the opening defined by the forward end to the housing, thereby retaining the rear end of the nose piece within the internal cavity 32 defined by the housing.

In the illustrated embodiment, for example, in which the forward end 30a of the housing 30 and the rear end 36b of the nose piece 36 are comprised of respective annular flanges, the outer diameter of the annular flange that forms the rear end of the nose piece is larger than the inner diameter of the annular flange that forms the forward end of the housing. However, the outer diameter of the annular flange that forms the rear portion of the nose piece is sized to generally approximate, but be slightly smaller than, the inner diameter defined by the lengthwise extending side walls of the housing that define the internal cavity 32. Since the annular flange that forms the rear portion of the nose piece has a size and shape that generally approximates the shape and size of the side walls of the housing that define the internal cavity and since the shape and size of the body of the nose piece advantageously approximates, but is slightly smaller than, the shape and size of the opening defined by the forward end of the housing, the movement of the nose piece relative to the housing is generally limited to axial movement in a lengthwise direction. In other words, the nose piece is typically unable to be angularly disposed relative to the lengthwise extending axis defined by the housing. Although not necessary for the present invention, the forward end of the nose piece may include one or more cutouts for drilled chips to escape.

The bushing 20 may also include a guide member 38 extending lengthwise through the housing 30. In contrast to the nose piece 36, the guide member is fixed in position relative to the housing as described below. In addition, the guide member has a forward end 38a disposed within a passage 40 defined by the nose piece. In this regard, the guide member and the nose piece are advantageously shaped and sized such that the forward end of the guide member snugly fits within the passage defined by the nose piece. Thus, the nose piece preferably slides over or along the guide member as the nose piece moves in a lengthwise direction relative to the housing. The guide member therefore serves to guide or further control the orientation of the nose piece relative to the housing and at least partially supports the nose piece. The guide member of the illustrated embodiment has a cylindrical shape, but may have other shapes if desired, so long as the forward end of the guide member may be received, typically in a snug fashion, within the passage defined by the nose piece.

The guide member 38 also defines a lengthwise extending passage 42. The passage defined by the guide member is generally cylindrical, but may have other shapes. The passage is also sized so as to receive the tool, such as a drill bit, carried by the chuck 16 of the drill 10. Advantageously, the passage defined by the guide member may be sized to approximate, but be slightly larger than the size of that portion of the tool that will extend through the guide member so that the guide member can serve to guide and support the tool, such as during drilling operations. Thus, the tool extends from a rear end that is engaged by the chuck, through the passages defined by the guide member and the nose piece 36, to a forward end that extends beyond the forward end 36a of the nose piece and into contact with the structure to be drilled.

As described above, the rear portion of the nose piece 36 may be annular as shown in cross-section in FIGS. 3 and 4 and in the embodiment in which the bushing 20 includes a guide member 38, may extend radially from the guide member to the housing 30. As such, the rear portion of the nose piece divides the internal cavity 32 into a forward portion and a rear portion. The relative sizes of the forward and rear portions may vary depending upon the position of the nose piece and, in particular, the rear end of the nose piece relative to the housing. In this regard, the forward portion of the internal cavity may be eliminated in instances in which the nose piece is advanced to its most forward position such that the rear end of the nose piece is proximate the forward end 30a of the housing. In contrast, the rear portion of the internal cavity may be eliminated in instances in which the nose piece is retracted to the fullest extent such that the rear portion of the nose piece is proximate the rear end 30b of the housing.

In order to facilitate slidable movement of the nose piece 36 relative to the housing 30 and the guide member 38 as well as to pneumatically seal or separate the forward and rear portions of the internal cavity 32, the bushing 20 may include a first seal 44 between the nose piece and the housing and, in particular, between the rear end 36b of the nose piece and the housing. In this regard, a circumferential, outwardly facing groove may be defined by the rear end of the nose piece for receiving and retaining an annular seal, such as an O-ring formed of Buna-N rubber. The annular seal therefore also maintains contacts with the side wall of the housing that defines the internal cavity. Likewise, the bushing may include a second seal 46 between the guide member and the nose piece and, in particular, between the forward end 38*a* of the guide member and the nose piece. As shown in FIGS. 3 and 4, the forward end of the guide member may also define a circumferential, outwardly facing groove for receiving and retaining an annular seal, such as an O-ring formed of Buna-N rubber. The annular seal therefore also maintains contact with the body of the nose piece. Thus, the first and second seals facilitate the slidable movement of the nose piece relative to the housing, while further pneumatically sealing or separating the first and second portions of the internal cavity defined by the housing.

The bushing 20 is capable of being pneumatically actuated. As such, the bushing may also include a gas inlet 48. The gas inlet is in fluid communication with the rear portion of the internal cavity 32 defined by the housing 30. As described below, the bushing may also include a gas outlet 50 in fluid communication with the rear portion of the internal cavity defined by the housing. Gas, such as shop air, may be supplied via the gas inlet to the rear portion of the internal cavity. A regulator 52, such as an air regulator, may be in fluid communication with either the gas inlet as shown in FIG. 1 or the gas outlet as shown schematically in FIGS. 3 and 4 to control the pressure maintained within the rear portion of the internal cavity, thereby permitting the pressure to be maintained at a desired level as described below. As also shown in FIG. 1, a pop-off or other safety valve 54 may also be disposed in fluid communication with the gas outlet. As known to those skilled in the art, a pop-off or other safety valve will automatically open when the pressure within the rear portion of the internal cavity exceeds a predefined threshold, thereby reducing the pressure within the rear portion of the internal cavity. As shown schematically in FIGS. 3 and 4, a switch 55 may also be disposed upstream of the gas inlet to control the introduction of gas via the gas inlet into the rear portion of the internal cavity. In one position, the switch will permit the introduction of gas via the gas inlet into the rear portion of the internal cavity, while in the other position, the switch will block or prevent gas from being introduced into the rear portion of the internal cavity via the gas inlet.

Gas may be supplied to the rear portion of the internal cavity 32 from a variety of sources. In one advantageous embodiment in which the drill motor 12 is a pneumatically actuated drill motor, a common air supply or pump supplies air to both the drill motor and to the gas inlet 48 for introduction into the rear portion of the internal cavity. Alternatively, separate air supplies may be utilized for the drill motor and the bushing 20.

In the illustrated embodiment, the bushing 20 also includes a support structure 56 extending rearwardly from the housing 30 toward the drill motor 12 in order to facilitate the attachment of the housing to the drill motor as described below. As shown, the support structure also generally defines an internal cavity 58 in which the chuck 16 is disposed. The support structure may be configured in various manners, but generally defines at least one and, in the illustrated embodiment, a plurality of openings into the internal cavity to permit the chuck to be readily accessed, such as to permit controlled rotation of the chuck in order to engage or disengage a tool, such as a drill bit. In the illustrated embodiment of FIG. 1, for example, the support structure includes a plurality of lengthwise extending members 60 that extend between opposed end portions. The lengthwise extending members are angularly spaced apart from one another, such as by 90 degrees or the like, such that a plurality of relatively large windows 62 are defined by the support structure that open into the internal cavity to permit the chuck to be accessed. Alternatively, the support structure could define a more closed structure, if so desired.

The support structure 56 generally includes an end plate 64 proximate the rear end 30*b* of the housing 30. The end plate defines an aperture 66 through which the tool, such as a drill bit, extends. Typically, the end plate is annular and defines a centrally located aperture through which the tool extends. As described below, the end plate of the support structure may be releasably attached to the housing. In addition, the support structure may be attached to the guide member 38. As such, the support structure serves to fixedly attach the housing and the guide member to the drill motor 12. While the guide member may be attached to the end plate of the support structure in various manners, the guide member of one embodiment is threadably connected to the end plate. For example, the aperture defined by the end plate may be sized and internally threaded so as to receive and threadably engage the rear end 38*b* of the guide member. Thus, the tool carried by the chuck may extend through the aperture defined by the end plate and through the lengthwise extending passage 42 defined by the guide member.

The end plate 64 serves to close the rear portion of the internal cavity 32 defined by the housing 30. As such, the end plate may include the gas inlet 48 and/or the gas outlet 50 in order to permit fluid communication with the rear portion of the internal cavity. In order to pneumatically seal the rear portion of the internal cavity, the bushing may include an additional seal 76, such as an annular O-ring or the like, disposed between the rear end 30*b* of the housing and the end plate. In this regard, either one or both of the rear end of the housing and the forwardly facing surface of the end plate may define a groove for receiving and retaining an O-ring that is compressed between the rear end of the housing and the end plate in instances in which the housing and the end plate are attached to one another.

As mentioned above, the housing 30 is releasably attached to the support structure 56. In this regard, the bushing may include a mounting mechanism for releasably attaching the housing to the support structure and, in particular, to the end plate 64 of the support structure. In one embodiment, the end plate defines a plurality of threaded openings 68 that are spaced angularly about the end plate. Likewise, the radially outwardly extending flange that forms the rear portion of the housing of the illustrated embodiment may similarly define openings at the same relative positions, both radially and angularly. Thus, the mounting mechanism of this embodiment may include threaded fasteners, such as bolts or the like, that may be threadably inserted through corresponding openings defined by the housing and the end plate.

Once the housing 30 is attached to the end plate 64, the rear portion of the internal cavity 32 defined by the housing is closed with the exception of the gas inlet and outlet 48, 50. If desired, however, the housing may be detached from the support structure 56 in order to access the rear portion of the internal cavity or to individually access the guide member 38, the nose piece 36 and the housing, such as for maintenance or the like. By facilitating access to the rear portion of the internal cavity defined by the housing, the bushing 20 of the present invention is advantageously re-configurable.

In this regard, the bushing 20 is capable of being pneumatically actuated as described above as a result of the introduction of gas via the gas inlet 48 which serves to urge the nose piece 36 forwardly relative to the remainder of the bushing. Alternatively, a spring 70 may be inserted in the rear portion of the internal cavity 32 defined by the housing 30 so as to spring load the nose piece. Thus, the bushing permits a spring, such as a cylindrical or a conical spring as shown in FIG. 4, to be inserted into the rear portion of the internal cavity defined by the housing and, once the housing has been reattached to the support structure, the spring will serve to actuate or bias the nose piece forwardly relative to the remainder of the bushing. If desired, the bushing may therefore be actuated by means of a combination of pneumatic actuation and spring actuation. Alternatively, the bushing may be entirely actuated by the spring.

By permitting the bushing 20 to be re-configurable and to support either pneumatic actuation or spring actuation, a single bushing may be utilized in conjunction with a pneumatically actuated drill motor 12 or in other instances in which a gas supply is available such that the bushing may be pneumatically actuated, as well as in instances in which the drill motor is not pneumatically actuated and a gas supply is not readily available and the bushing must be actuated by means of a spring. Accordingly, a technician need not maintain different types of bushings capable of being actuated in different manners, but can simply utilize a single bushing which can be actuated either pneumatically, with a spring or by a combination thereof.

Figure 5B:
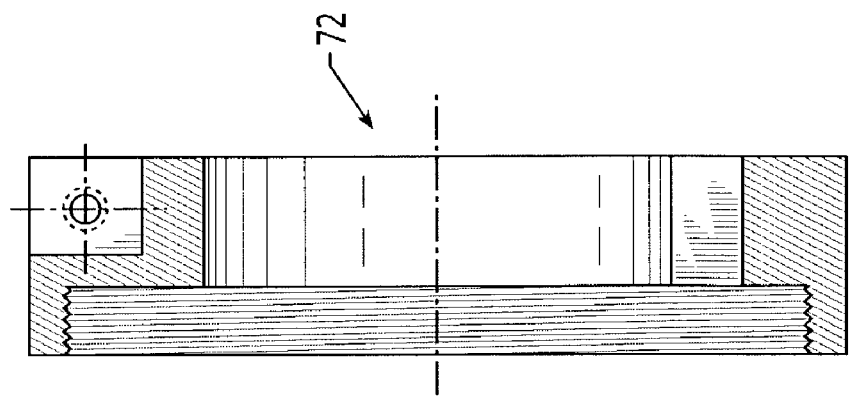
FIGS. 5A and 5B are a plan view and a cross-sectional view, respectively, of a mounting member of a bushing of one embodiment of the present invention.
Figure 5A:
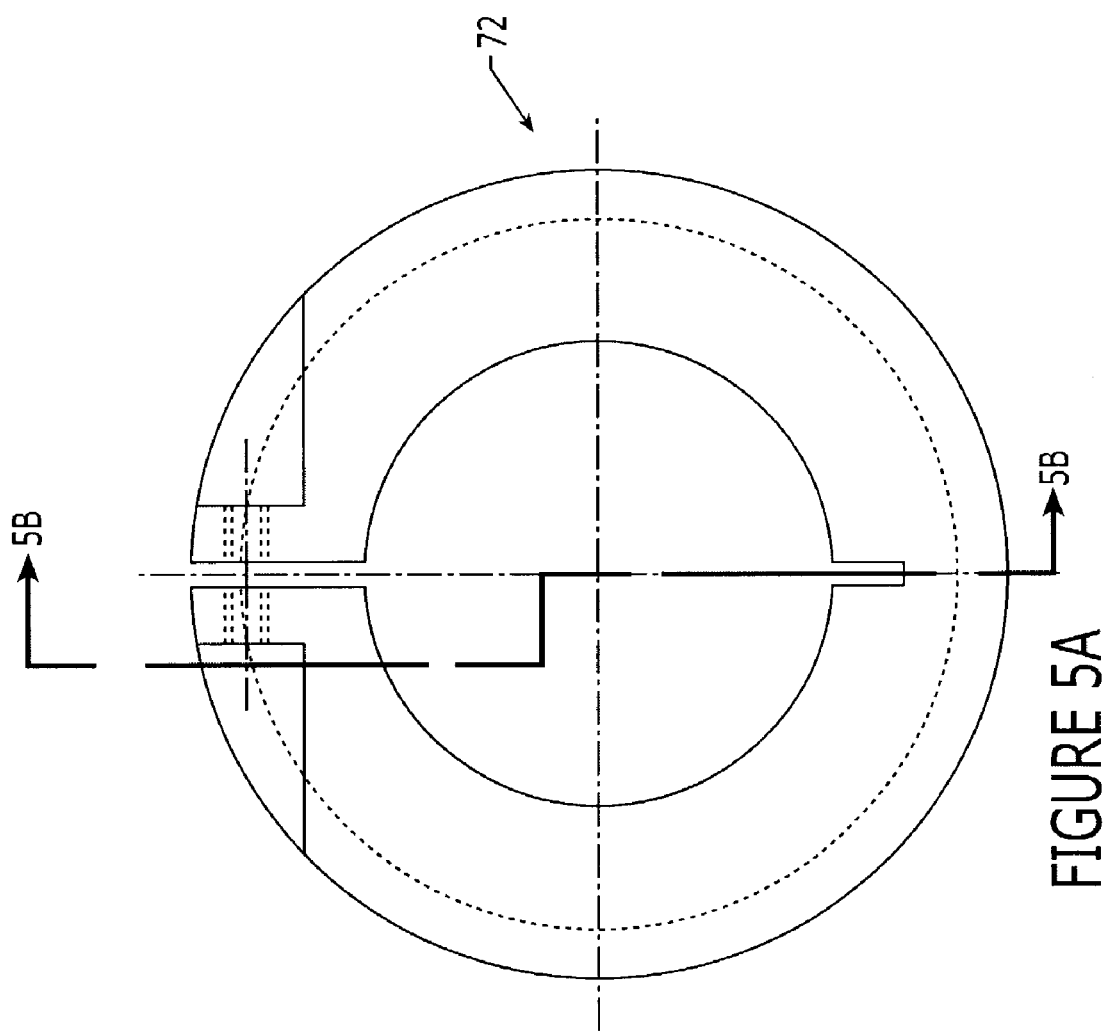

The support structure 56 is also advantageously attached to the drill motor 12. In this regard, the rear end of the support structure, opposite the end plate 64, is advantageously attached to the drill motor. In the illustrated embodiment, for example, the bushing 20 includes a mounting member 72 for attaching the support structure to the drill motor. While the mounting member may attach the support structure to the drill motor in various manners, the mounting member of one embodiment is a collar that defines an opening therein, as shown in FIGS. 5A and 5B. Thus, the collar may be positioned so as to encircle a portion of the drill motor. The collar may then be tightened, such as by tightening a fastener that extends through and connects the separated portions of the collar. Although the collar may also be clamped about the rear end of the support structure, the collar is internally threaded so as to threadably engage the threaded rear end of the support structure in the illustrated embodiment. Thus, the support structure and, in turn, the remainder of the bushing may be securely attached to the drill motor. However, the mounting member can be loosened, if desired, so as to detach the entire bushing from the drill motor. In one configuration, the guide member 38, the support structure 56, and the mounting member 72 are threaded together through respective threaded engagements. Alternatively, the guide member 38, the support structure 56, and the mounting member 72 can be integrally machined in one piece. Thus, eliminating the need to be a threaded assembly.

Figure 6A:
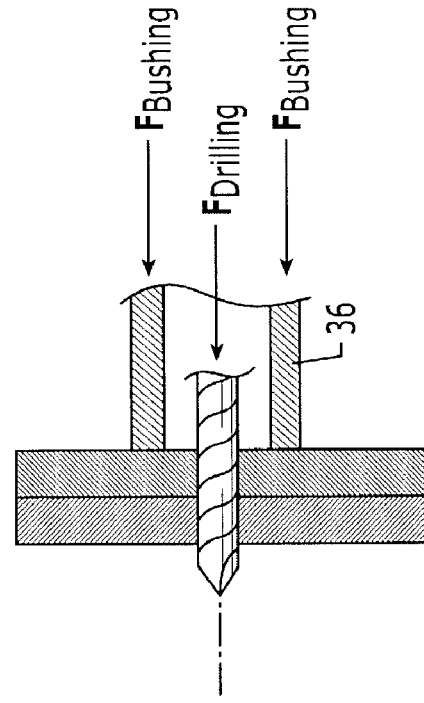
FIGS. 6A–6D are a series of schematic representations of the formation of a hole in a multi-layer structure utilizing a drill including a bushing in accordance with one embodiment of the present invention.
Figure 6B:
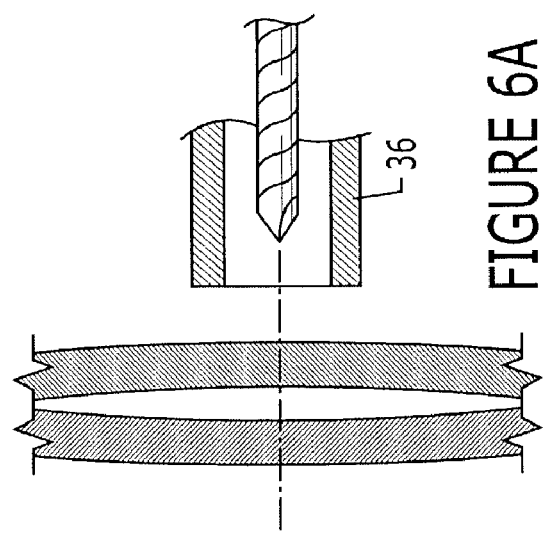

In operation, the bushing 20 is assembled to a drill motor 12 and the forward end 36a of the nose piece 36 is placed in contact with the structure at the location at which a hole is to be formed. As a result of the actuation of the drill bushing, such as either pneumatically and/or with a spring, the bushing applies a force to the structure as shown in FIG. 6B. This force serves to compress the structure and, in instances in which the structure is comprised of a laminate or multi-layer structure, serves to close or at least reduce gaps between the layers that may have previously existed as shown in FIG. 6A.

The bushing 20 may be actuated so as to provide a desired force to the structure. As will be apparent to those skilled in the art, the force that is applied by the bushing is dependent upon the force or pressure with which the nose piece 36 is urged forwardly in combination with the surface area of the forward end of the nose piece that contacts the structure. For a bushing having a nose piece with an annular rear end 36b having an outer radius of $11/16$ inch and an inner radius of $5/16$ inch, the cross-sectional area of the rear end of the bushing that is contacted by the inlet air is 1.18 in.$^2$. This is the area of the nose piece that gas pressure is pushing on. In instances in which the air is supplied at a pressure of 90 psi to activate the bushing, the maximum clamping force that the bushing may provide is $F_{max}$=PA=90 psi (1.18 in$^2$)=106 lbs.

Several examples of the clamping force provided by a bushing 20 in response to various levels of regulated pressure within the rear portion of the internal cavity 32 of the housing 30 are provided below by way of example:

| Clamping Force (lbs) | Regulated Pressure (psi) |
| --- | --- |
| 20 | 17 |
| 25 | 21 |
| 30 | 26 |
| 35 | 30 |
| 40 | 34 |

Preferably, the technician determines the desired force that the bushing 20 will impart to the structure in order to reduce, if not completely close, gaps within the structure. As will be apparent to those skilled in the art, the amount of force that the bushing desirably imparts to the structure will be dependent upon a number of factors including the material properties of the various layers of the structure, the anticipated gaps within the structure and the like. Since the technician must be capable of also applying not only a force equal to the force imparted by the bushing to the structure, but also a force required to advance the tool, such as a drill bit, through the structure, the force that will be desirably imparted by the bushing to the structure is also selected such that the sum of the force imparted by the bushing to the structure and the force anticipated to be required to advance the tool, such as a drill bit, through the work piece can be provided by the technician.

Figure 6C:
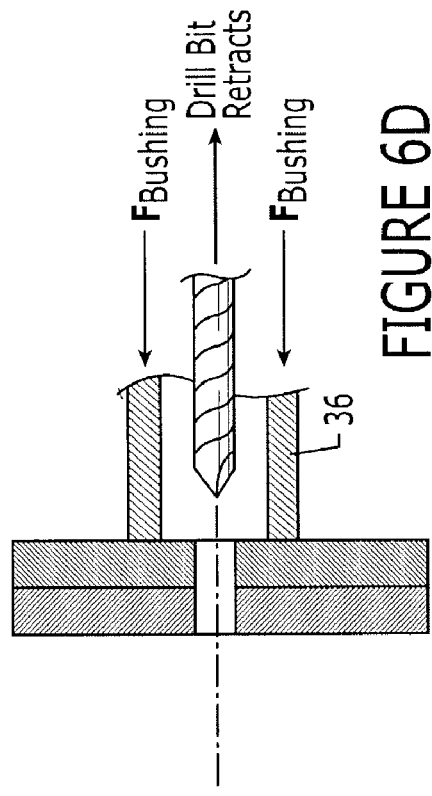
Figure 6D:
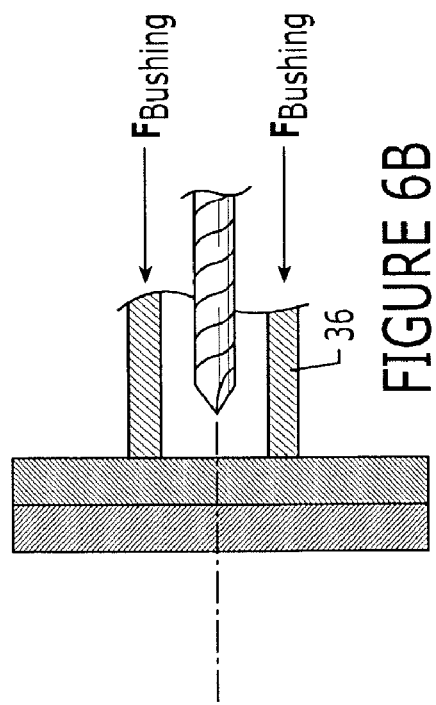

With reference to FIG. 6B, for example, the operator must generally apply a force equal to the force imparted by the bushing 20 to the structure once the forward end 36a of the nose piece 36 contacts the surface of the structure, thereby reducing, if not closing, gaps within the structure. As the tool, such as a drill bit, advances through the structure, the technician must provide a force equal to the sum of the force imparted by the bushing to the structure and the force required to advance the tool through the structure as shown in FIG. 6C. Once the hole has been formed and the tool is being retracted, the technician must continue to apply force equal to the force imparted by the bushing to the structure so that the gap will not open until the tool is completely removed from the hole as shown in FIG. 6D.

In order to permit the bushing 20 of the present invention to reduce or close gaps within a structure and to permit the tool to advance through the structure, the amount of travel in a lengthwise direction provided by the bushing must equal or exceed the cumulative size, also in the lengthwise direction, of the gaps within the structure and the thickness of structure. In this regard, the distance in a lengthwise direction between the rear end 36b of the nose piece 36 in the fully forwardly extended position and the forward end of end plate 64 of support structure 56 preferably equals or exceeds the cumulative size, also in a lengthwise direction, of the gap(s) within the structure and the thickness of structure. Moreover, the lengthwise distance between the forward end 36a of the nose piece and the forward end of the tool is preferably at least as large as the cumulative size, also in the lengthwise direction, of gaps within the structure to permit the gaps to be closed during drilling. In one typical embodiment, the bushing is designed to reduce or close initial gaps having a cumulative size in the lengthwise direction of 3/16 inch or less. However, the bushing may be designed to accommodate gaps of other sizes if so desired. The bushing will continuously close the existing and induced gaps during its travel and tool advancement.

While the foregoing example has described the manner in which the regulated pressure within the rear portion of the internal cavity 32 is selected such that the bushing 20 imparts a desired force to the structure, a comparable process is followed in order to determine the type and size of spring 70 to be disposed within the rear portion of the internal cavity of the housing in order for the bushing to impart a desired force to the structure in instances in which the bushing is actuated by a spring 70, as opposed to being pneumatically actuated.

Regardless of the manner in which the bushing is actuated, the bushing of the present invention therefore advantageously imparts a force to a structure in which a hole is to be formed that serves to reduce or close gaps within the structure. As such, inter-laminar burrs are reduced or eliminated and fewer, if any, chips accumulate within and migrate through gaps within the structure. As a result, the structure generally need not be disassembled after the drilling operations in order to remove the inter-laminar burrs and chips and otherwise clean the multiple layers prior to continuing with the assembly process, including the installation of fasteners or the like. As such, a drill 10 and the associated bushing 20 of the present invention may increase the speed with which holes may be formed in multi-layer or laminate structures and may therefore increase the efficiency and decrease the costs associated with the fabrication of these structures. While the advantages provided by the drill and associated bushing of the present invention are useful for a wide variety of structures, the drill and associated bushing of the present invention are particularly advantageous for the formation of holes in partially assembled structures, i.e., structures in which fasteners have already been installed in other portions of the structure, since the disassembly and cleaning of the structure would significantly delay the assembly process.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A re-configurable bushing comprising:
    a housing extending lengthwise between opposed forward and rear ends and defining an internal cavity;
    a nose piece slidably disposed relative to said housing, wherein a forward portion of said nose piece is capable of extending through an opening defined by the forward end of said housing;
    a gas inlet in fluid communication with a rear portion of the internal cavity defined by said housing between a rear portion of said nose piece and the rear end of said housing;
    an end plate proximate the rear end of said housing and fixed in position relative to said housing;
    a mounting mechanism for releasably attaching said housing to a drill motor during operation thereof, said mounting mechanism also permitting said housing to be detached from the drill motor so as to access the rear portion of the internal cavity; and
    a spring removably disposed within the rear portion of the internal cavity and extending lengthwise between said end plate and said nose piece to bias the nose piece forwardly relative to said housing,
    wherein the bushing is re-configurable to permit said nose piece to be alternately actuated pneumatically by gas introduced into the rear portion of the internal cavity via said gas inlet and mechanically by said spring disposed in the rear portion of the internal cavity.

2. A re-configurable bushing according to claim 1 further comprising a support structure extending lengthwise in a rearward direction from said housing, said support structure also defining an internal cavity adapted to receive a chuck.

3. A re-configurable bushing according to claim 2 wherein said support structure also defines an opening to the internal cavity defined thereby for facilitating access to the chuck.

4. A re-configurable bushing according to claim 2 further comprising a mounting bracket for attaching said support structure to a drill motor.

5. A re-configurable bushing according to claim 2 wherein the end plate defines an opening through which a tool carried by the chuck extends, and wherein the end plate incorporates said gas inlet.

6. A re-configurable bushing according to claim 5 wherein the end plate further includes a gas outlet in fluid communication with the rear portion of the internal cavity defined by said housing.

7. A re-configurable bushing according to claim 2 wherein said mounting mechanism releasably attaches said housing to said support structure such that said housing and said support structure may be detached to provide access to the internal cavity.

8. A re-configurable bushing according to claim 1 wherein said spring is selected from the group consisting of a cylindrical spring and a conical spring.

9. A re-configurable bushing according to claim 1 further comprising a gas outlet in fluid communication with the rear portion of the internal cavity defined by said housing.

10. A re-configurable bushing according to claim 1 further comprising a guide member extending lengthwise through said housing and having a forward end disposed within a passage defined by said nose piece, wherein said guide member also defines a lengthwise extending passage for receiving a tool.

11. A re-configurable bushing according to claim 10 wherein said guide member is fixed in position relative to said housing.

12. A re-configurable bushing according to claim 10 further comprising:
    a first seal between said nose piece and said housing; and
    a second seal between said guide member and said nose piece.

13. A pneumatically actuated bushing comprising:
    a housing extending lengthwise between opposed forward and rear ends and defining an internal cavity and openings in the opposed ends thereof;

a nose piece defining a lengthwise extending passage and slidably disposed relative to said housing, wherein a forward portion of said nose piece is capable of extending through the opening defined by the forward end of said housing and a rear portion of said nose piece is larger than the opening defined by the forward end of said housing to thereby retain said nose piece at least partially within said housing;

a gas inlet in fluid communication with a rear portion of the internal cavity defined by said housing between the rear portion of said nose piece and the rear end of said housing; and a support structure comprising an end plate proximate the rear end of said housing, wherein the end plate defines an opening through which a tool extends, and wherein the end plate incorporates said gas inlet.

14. A pneumatically actuated bushing according to claim 13 further comprising a guide member extending lengthwise through said housing and having a forward end disposed within the passage defined by said nose piece, wherein said guide member also defines a lengthwise extending passage for receiving a tool.

15. A pneumatically actuated bushing according to claim 14 wherein said guide member and the passage defined by said nose piece are sized such that said guide member is snugly disposed within the passage defined by said nose piece.

16. A pneumatically actuated bushing according to claim 14 wherein said guide member is fixed in position relative to said housing.

17. A pneumatically actuated bushing according to claim 14 further comprising:
a first seal between said nose piece and said housing; and
a second seal between said guide member and said nose piece.

18. A pneumatically actuated bushing according to claim 14 wherein the rear portion of said nose piece is annular and extends from said guide member to said housing to divide the internal cavity into forward and rear portions.

19. A pneumatically actuated bushing according to claim 13 further comprising a gas outlet in fluid communication with the rear portion of the internal cavity defined by said housing.

20. A pneumatically actuated bushing according to claim 13 wherein said support structure extends lengthwise in a rearward direction from said housing, said support structure also defining an internal cavity adapted to receive a chuck.

21. A pneumatically actuated bushing according to claim 20 wherein said support structure also defines an opening to the internal cavity defined thereby for facilitating access to the chuck.

22. A pneumatically actuated bushing according to claim 13 further comprising a mounting bracket for attaching said support structure to a drill motor.

23. A pneumatically actuated bushing according to claim 13 wherein the end plate further includes a gas outlet in fluid communication with the rear portion of the internal cavity defined by said housing.

24. A pneumatically actuated bushing according to claim 13 wherein said support structure is releasably attached to said housing such that said housing and said support structure may be detached to provide access to the internal cavity, and wherein the rear portion of the internal cavity is sized to receive a spring to bias the nose piece forwardly relative to said housing such that the bushing is re-configurable to permit said nose piece to be alternately actuated pneumatically by gas introduced into the rear portion of the internal cavity via said gas inlet and mechanically by a spring disposed in the rear portion of the internal cavity.

25. A drill comprising:
a drill motor;
a chuck for engaging a tool, said chuck operatively connected to said drill motor; and
a bushing capable of being pneumatically actuated and further capable of receiving the tool carried by said chuck, said bushing comprising:
a housing defining an internal cavity;
a nose piece slidably disposed relative to said housing, wherein a forward portion of said nose piece is capable of extending through an opening defined by a forward end of said housing and a rear portion of said nose piece is larger than the opening defined by the forward end of said housing to thereby retain said nose piece at least partially within said housing;
a gas inlet in fluid communication with a rear portion of the internal cavity defined by said housing between the rear portion of said nose piece and a rear end of said housing; and
a support structure comprising an end plate proximate the rear end of said housing, wherein the end plate defines an opening through which the tool carried by said chuck extends, and wherein the end plate incorporates said gas inlet.

26. A drill according to claim 25 wherein said support structure extends lengthwise in a rearward direction from said housing, said support structure also defining an internal cavity to receive said chuck.

27. A drill according to claim 26 further comprising a mounting mechanism for releasably attaching said housing to said support structure, said mounting mechanism permitting said housing to be detached from the support structure so as to access the rear portion of the internal cavity.

28. A drill according to claim 26 wherein said support structure also defines an opening to the internal cavity defined thereby for facilitating access to said chuck.

29. A drill according to claim 26 further comprising a mounting bracket for attaching said support structure to said drill motor.

30. A drill according to claim 25 wherein the end plate further includes a gas outlet in fluid communication with the rear portion of the internal cavity defined by said housing.

31. A drill according to claim 30 further comprising a regulator in fluid communication with said gas outlet for regulating the pressure within the rear portion of the internal cavity.

32. A drill according to claim 25 further comprising a guide member extending lengthwise through said housing and having a forward end disposed within a passage defined by said nose piece, wherein said guide member also defines a lengthwise extending passage for receiving the tool.

* * * * *